J. W. JAY.
MEANS FOR ATTACHING BAITS TO LINES.
APPLICATION FILED SEPT. 2, 1916.
1,226,891.
Patented May 22, 1917.
2 SHEETS—SHEET 2.
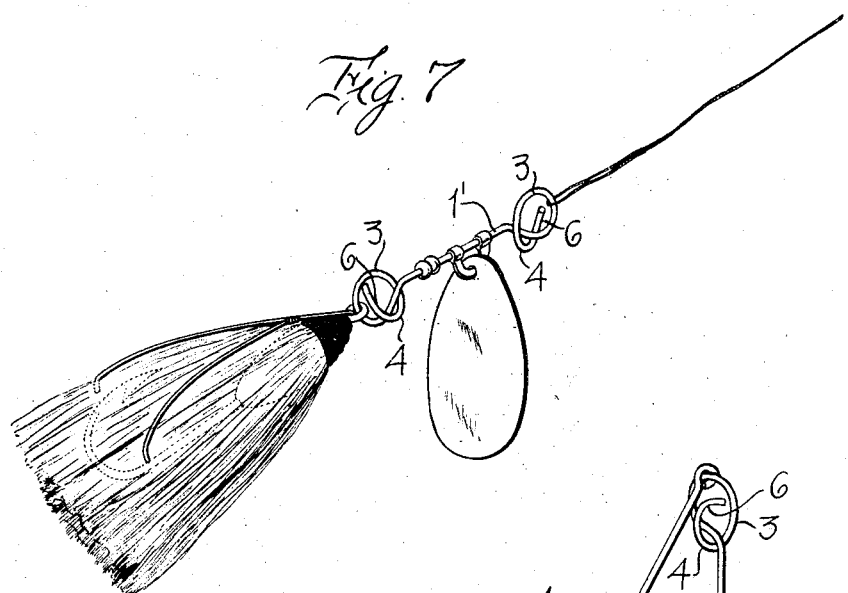
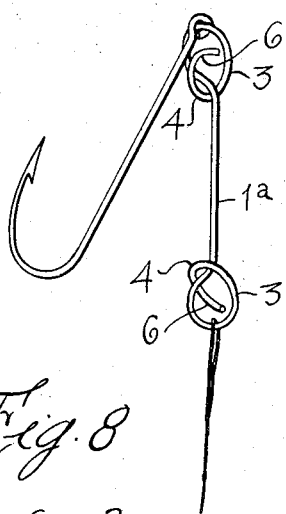
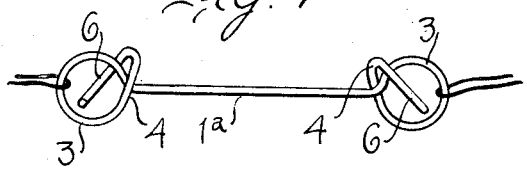
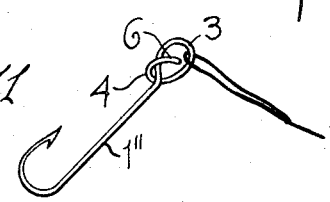
Inventor
J. W. Jay
By Frederick S. Still
Attorney

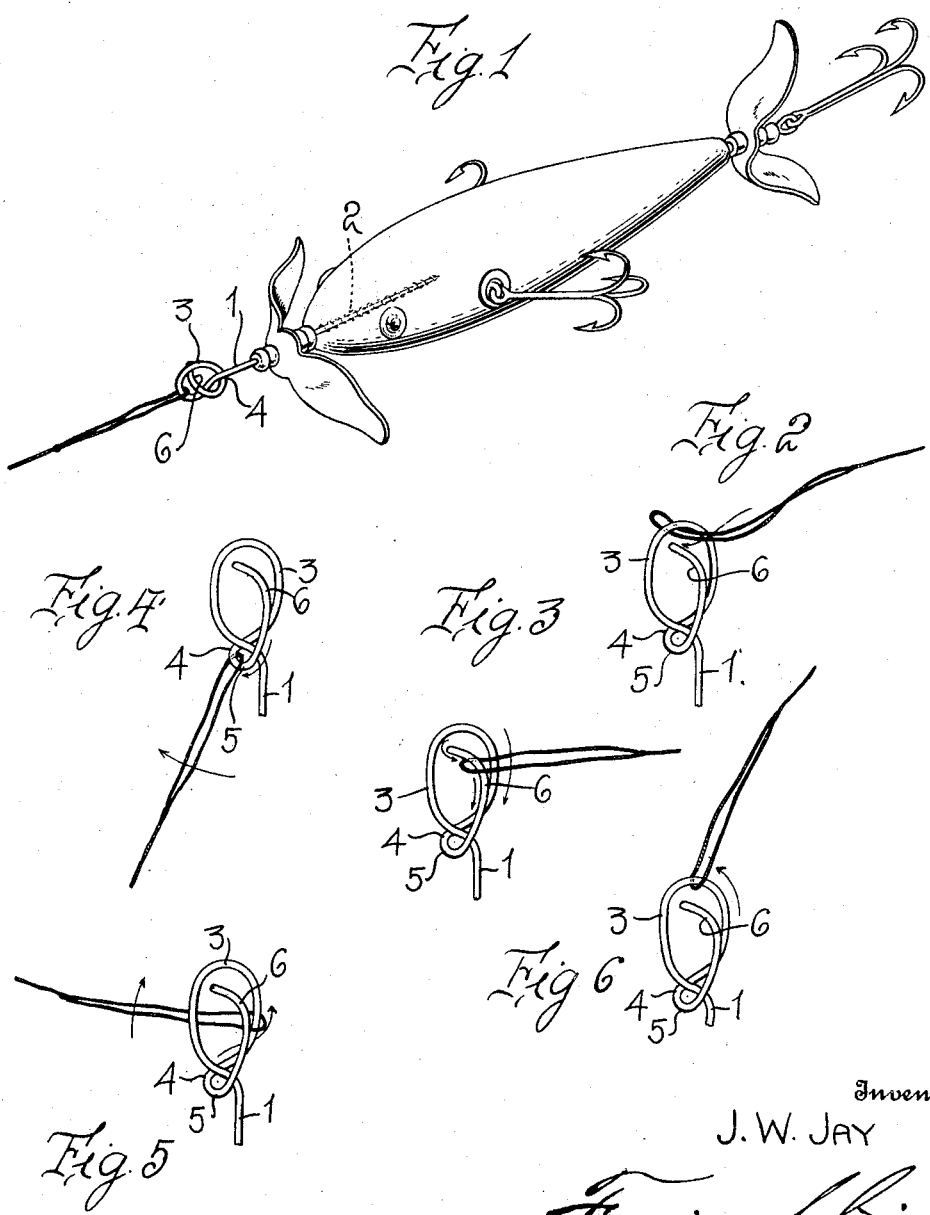

UNITED STATES PATENT OFFICE.

JAMES WILLIAM JAY, OF PHILADELPHIA, PENNSYLVANIA.

MEANS FOR ATTACHING BAITS TO LINES.

1,226,891. Specification of Letters Patent. Patented May 22, 1917.

Application filed September 2, 1916. Serial No. 118,259.

*To all whom it may concern:*

Be it known that I, JAMES WILLIAM JAY, a citizen of the United States, residing at Philadelphia, in the county of Philadelphia and State of Pennsylvania, have invented certain new and useful Improvements in Means for Attaching Baits to Lines, of which the following is a specification.

This invention comprehends certain new and useful improvements in means for attaching baits to lines, and relates particularly to an improved eye which may be secured to a wooden minnow or formed on a spoon shank or fishhook for use as a quick and most efficient means for the attachment of the line thereto.

Heretofore, as is well known to anglers, it has been customary to secure to a wooden minnow an ordinary screw eye, or to form upon the end of the shank of a fishhook or spoon an eye formed by returning the metal upon itself, so that the extremity will come in close contact with the metal at the base of the eye, the end of the metal being in some instances coiled around the shank one or more times in order to further strengthen the loop or eye. These provisions for attaching the line have been resorted to and in common use since the inception of the idea of a fishhook, and to the best of my knowledge, very little effort has been made to improve the old-style eye and the manner of attaching the bait or lure to the line has rested entirely in the use of knots, tied according to the angler's own ideas as to security and convenience in attaching and detaching.

However, with the advent of angling for game fish, such as bass, pickerel and the like, and with the improvements in weedless fishhooks, wooden minnows, spoon lures and various other attachments that have been invented for the sportsman-like angler, the use of numerous baits became necessary and, therefore, the need for quicker and easier means of attaching and detaching baits and lures to lines became apparent. Up to this time this need has only been taken care of in the use of swivel snaps, quick-catch connecting links, split rings, etc., which, when attached securely to the end of the line, provided seemingly suitable means for effecting the quick changes of lures that fishermen want, but my invention proposes to produce a different style of eye which will result in important advantages which will be appreciated by anglers, my improved eye not only being capable of operating equally as well as did the old-style eye, when the lines were attached by hard knots or any other style of fishermen's knots, with snap swivels, quick-catch connecting links, split rings, etc., but which in addition thereto will first, have the advantage of being more secure than the usual type of straight eye which, when pulled upon from uncommon angles, has with fair frequency, been known to pull out or straighten out, and in some cases to break.

Not only is it one of the primary objects of my invention to provide an improved eye for attaching lines to baits which will possess all of the advantages of the old-style straight eye, as well as the advantage of not being liable under usual or even unusual conditions to pull or straighten out, or break, but it is one of the objects of my invention to provide an eye of this character so arranged that the possibility of the line being partly cut and thereby weakened by accidentally coming in contact with the harsh edge of the metal, as is the case with the straight type of eye, will be positively prevented, my improved eye being so formed that no matter what position the line takes, with relation to the eye in the actual use of the device, it will be impossible for the line to contact with any sharp edge or end.

A still further object of my invention, and one of the most important objects thereof, is to provide an eye of this character which will possess, to a maximum degree, the advantage of convenience, in attaching and detaching the line, whereby the angler is enabled to change baits or lures as often as he chooses without any untying of knots or tying of them, or without any unsnapping of swivels, rings and the like; and the advantage of this susceptibility of quick and convenient change, without any liability of weakening or of breaking the line.

A still further object of the invention is to provide an eye of this character which can be manufactured just as easily and cheaply as the old straight type of eye or loop heretofore commonly used, whether my improved eye be formed as a screw eye for attachment to a wooden minnow, or formed directly on the end of a hook shank or spoon shank.

With these and other objects in view, as will more fully appear as the description proceeds, my invention consists in certain constructions, arrangements and operations of the parts as I shall hereinafter fully describe and claim.

For a full understanding of the invention, reference is to be had to the following description and accompanying drawings, in which—

Figure 1 is a perspective view of a wooden minnow with my improved eye secured thereto.

Figs. 2 to 6 inclusive, illustrate, by perspective views, and with darts or arrows, the manner in which the looped end of the fishing line is readily attached to the eye.

Fig. 7 is a perspective view of the device shown in connection with a spoon lure.

Figs. 8 and 9 are views illustrating another embodiment of the invention.

Fig. 10 is a fragmentary view of the eye, and

Fig. 11 is a perspective view showing the eye formed on the end of a fishhook.

Corresponding and like parts are referred to in the following description and designated in all of the views of the accompanying drawings by like reference characters.

In describing my invention, I will first refer to that embodiment thereof illustrated in Fig. 1, wherein the device is shown as formed for attachment to a wooden minnow and wherein 1 designates the shank which is screw-threaded, as at 2, although it is to be understood that wherever the term "shank" is employed herein it comprehends broadly the main stem or rod from which the eye emanates, whether it be the screw-threaded shank 1, the shank of a spoon, the shank of a fishhook or the shank merely of a connecting link for use in connecting any construction of lure to a line or to a quick-acting catch or swivel snap attached to the line.

In carrying out my invention, the metal forming the shank is at one end coiled or returned upon itself to form the main or loop portion 3 of the eye, is extended across one side of the shank as at 4, and thence extended transversely around the shank to the opposite side thereof, as at 5, the extremity 6 being turned in a plane transverse to the plane of the loop portion 3, and extended into the eye and preferably through the same so that it projects beyond one face of the loop portion 3.

In attaching the line to the eye, a loop, as is customary, is tied in one end of the line, and the fisherman, by pinching the loop together at one end thereof passes it through the loop portion 3, from that side thereof which may be called the rear side, as it is the side opposite to the side where the projecting extremity 6 is disposed. The pinched end of the loop is passed through the loop portion 3 from rear to front, as just stated, and engaged over the extremity 6 and the loop of the line is then passed around the bends 4 and 5 until it is finally received in the loop portion 3. This operation, as is manifest, can be very easily and quickly performed, and after it has been performed, the fisherman may feel perfectly secure, as it will be found to be impossible to bring the line and the lure on which the eye is formed or to which it is secured, to any relative position, either with a slack or taut line, where there will be any liability or possibility of the line becoming detached from the eye. The only possible way in which the line may become detached is by entirely reversing the operation of attachment, hereinbefore described, and this can only be manually performed.

It will thus be seen that I have prepared an improved eye which will not only possess to a maximum degree the advantage of quick attachment and detachment without any liability of accidental detachment; but it is to be also noted that in the formation of my eye no part of the metal touches any other part, whereby there is no flattening of the line necessary to cause it to pass from one portion of the eye to the next in the operation of attachment or detachment, and consequently the line is not weakened in any way except by the ordinary friction which is an incident necessary to any form of attachment.

In that form of my invention illustrated in Fig. 1 hereinbefore specifically referred to, the eye is designed for attachment to a wooden minnow, but as hereinbefore indicated, the invention is by no means limited thereto. For example, reference is to be had to Fig. 7, wherein the shank 1' constitutes the shank of a spoon and is formed at either or both ends with an eye like the eye hereinbefore specifically described, both ends being shown as formed with these eyes in the present instance. Thus not only may the line be easily attached to one end of the shank, but a bucktail or other hook attached to the other end of the shank, whereby a quick and easy changing of baits, like differently colored bucktails, is permitted. It will be understood that in this embodiment of the invention, only one end of the shank need be formed with my improved eye, and the other end of the shank can be otherwise formed for attachment of a hook thereto, or my improved eye may be formed on one end of the hook itself, as best illustrated in Fig. 11, where the shank is designated 1.

As a still further embodiment of my invention, reference is to be had to Figs. 8 and 9, wherein the shank is designated 1ª and the device is in the form of a quick-catch connecting link having my improved eye at each end thereof, one for attaching to the line and one for applying the hooks.

While the accompanying drawing illustrates what I believe to be the preferred embodiments of my invention, it is to be understood that the invention is not limited thereto, but that various changes may be made in the forms of the eye itself and various adaptations of the eye to various forms of lures may be made without departing from the scope of the invention as defined in the appended claims.

What is claimed, is:

1. A device of the character described, comprising a shank and an eye carried thereby, said eye including a looped portion, and the material out of which the shank is formed being continued across and around the shank from the looped portion and extending within the latter.

2. A device of the character described, comprising a shank and an eye carried thereby, said eye including a looped portion, and the material out of which the shank is formed being continued across and around the shank from the looped portion and terminating within the latter with the extremity protruding through and beyond the looped portion.

3. A device of the character described, comprising a shank and an eye carried thereby, the eye including a looped portion and the substance out of which the same is formed being continued past the loop on one side of the shank, thence around the shank, and turning transversely with the extremity extended into the looped portion.

4. A device of the character described, comprising a shank and an eye carried thereby, the eye including a looped portion and the substance out of which the same is formed being continued past the loop on one side of the shank, thence around the shank, and turning transversely with the extremity extended into the looped portion, all of said parts being spaced from and out of contact with each other, as and for the purpose set forth.

5. A device of the character described, comprising a shank, the metal out of which the shank is formed being returned upon itself at one end to form a loop, and extended across the shank at one side thereof, thence around the shank and finally terminating with a curved end extending substantially at right angles to the plane of the loop and with its extremity mounted within and protruding beyond the loop, as and for the purpose set forth.

In testimony whereof I affix my signature in the presence of two witnesses.

JAMES WILLIAM JAY.

Witnesses:
MARTIN PIEHN,
M. A. HOOD.